(12) United States Patent
Melody et al.

(10) Patent No.: US 6,409,905 B1
(45) Date of Patent: Jun. 25, 2002

(54) METHOD OF AND ELECTROLYTE FOR ANODIZING ALUMINUM SUBSTRATES FOR SOLID CAPACITORS

(75) Inventors: Brian J. Melody; John T. Kinard, both of Greer; Philip M. Lessner, Simpsonville; Albert K. Harrington, Mauldin; David A. Wheeler, Williamston, all of SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/709,742

(22) Filed: Nov. 13, 2000

(51) Int. Cl.$^7$ ................................................ C25D 11/06
(52) U.S. Cl. ........................ 205/234; 205/324; 205/332
(58) Field of Search ................................ 205/234, 324, 205/325, 326, 332

(56) References Cited

U.S. PATENT DOCUMENTS

| | | |
|---|---|---|
| 1,906,691 A | 5/1933 | Lilienfeld |
| 3,796,644 A | 3/1974 | Bernard |
| 4,093,972 A | 6/1978 | Voyles |
| 4,146,439 A | 3/1979 | Randall, Jr. |
| 4,203,194 A | 5/1980 | McGrath |
| 4,288,842 A | 9/1981 | Voyles |
| 4,606,975 A * | 8/1986 | Mohr ........................ 428/469 |
| 5,674,371 A * | 10/1997 | Patel ........................ 205/105 |
| 5,935,408 A * | 8/1999 | Kinard et al. ............... 205/234 |
| 6,149,793 A * | 11/2000 | Melody et al. ............. 205/234 |

\* cited by examiner

*Primary Examiner*—Donald R. Valentine
*Assistant Examiner*—William T. Leader
(74) *Attorney, Agent, or Firm*—Banner & Witcoff, Ltd.

(57) ABSTRACT

A method of anodizing comprising suspending at least one aluminum substrate into an electrolyte solution and applying an anodizing current to the electrolyte solution, wherein the electrolyte solution comprises from about 5 to about 99.5 wt % glycerine, about 0.05 to about 5.0 wt. % of at least one orthophosphate salt selected from the group consisting of ammonium phosphates, alkali metal phosphates, amine phosphates, or mixtures thereof, and water.

20 Claims, No Drawings

METHOD OF AND ELECTROLYTE FOR ANODIZING ALUMINUM SUBSTRATES FOR SOLID CAPACITORS

FIELD OF THE INVENTION

The invention is directed to a method of and electrolyte for anodizing aluminum substrates for solid capacitors.

BACKGROUND OF THE INVENTION

Electrolytic capacitors have long been recognized as the most volumetrically efficient (i.e., as having the highest capacitance×voltage product for a given volume) type of capacitor available. This high capacitance×voltage product (commonly called "CV") is made possible by the extremely thin anodic oxide dielectric layer present in electrolytic capacitors.

Capacitors containing very high surface area electrodes and employing polarization/depolarization of the so-called Helmholtz double layer formed by the contact of these high surface area electrodes and a conductive liquid or gel electrolyte may have extremely high capacitance values per unit volume but these double-layer capacitors are limited to very low voltages (1–3 volts) per cell by the electrolytic decomposition voltage of the electrolyte. The fine pore structure of the electrodes combined with the electrical conductivity limitations of liquid electrolytes results in relatively high equivalent series resistance (ESR) for double-layer capacitors. Modem electronic circuits generally require low-ESR devices, thus electrolytic capacitors remain the devices of choice for applications requiring capacitors having a high capacitance×voltage (CV) product per unit volume.

The introduction of so-called "solid" tantalum capacitors (consisting of an anodized porous tantalum compact impregnated with manganese dioxide cathode material) in the early 1950's made possible the use of electrolytic capacitors in higher frequency circuits requiring low equivalent series resistance as well as high CV density (i.e., high CV product per unit volume) devices. The lower ESR characteristic of these capacitors is due, in large part, to the 1–2 order of magnitude higher conductivity of the manganese dioxide cathode material compared with the liquid electrolyte cathode material used in older "wet" electrolytic capacitor designs.

The density of component placement on circuit boards increased greatly with the widespread adoption of "surface mount" circuit board construction in the 1980's. Surface mount devices attach directly to the circuit board conductive traces, via solder or conductive adhesive attachment, thereby reducing resistive losses and inductance associated with components fabricated with wire leads. Surface mount solid capacitors were introduced by major manufacturers in the 1970's and grew to be the dominant form of solid capacitors by the end of the 1980's.

Surface mount solid capacitors have traditionally been fabricated from porous powder metallurgy tantalum compacts which have been anodized, impregnated with manganese dioxide, and coated with carbon and conductive paint (usually containing silver powder) before final encapsulation.

Surface mount tantalum capacitors are fabricated in two general configurations, molded body and conformally-coated devices. Molded body devices have the general construction described in U.S. Pat. No. 4,288,842 which teaches a silver paint-coated tantalum anode body encapsulated in a molded, insulating material case having a pair of wrapped electrical leads extending from the case walls and connected to the encapsulated anode body via welding or conductive adhesive, etc. Conformally-coated surface mount tantalum capacitors fall into two sub-catagories depending on the type of electrode terminations employed. One type of termination follows the general construction described in U.S. Pat. No. 4,093,972 in which metallic end caps are attached to the insulating polymer conformally coated anode body to provide external electrode connections. The other type of termination follows the general construction described by U.S. Pat. No. 4,203,194 in which the insulating polymer conformally coated body is provided with external electrode connections via plating processes.

The surface mount solid capacitors, described above, employ anode bodies fabricated from powder metallurgy tantalum anode compacts. It has long been recognized that "solid" capacitors containing etched and anodized aluminum foil anode coupons in place of the powder metallurgy porous tantalum anodes bodies would not only have the advantage of the much lower cost of aluminum as an anode material but would also exhibit a low equivalent series resistance (ESR) due to the very short electrical path length (generally on the order of 0.001 to 0.002 inch) from the inner to the outer portion of the etch structure of the aluminum foil compared to the generally much longer electrical path length present in powder metallurgy tantalum anodes. A "solid" aluminum capacitor is described in U.S. Pat. No. 1,906,691 in which the liquid electrolyte traditionally present in aluminum electrolytic capacitors is replaced with a semi-conducting solid such as cuprous oxide or sulfide. Such fabrication methods were expensive and difficult to control. The product produced by these methods is variable, depending upon the exact stoichiometry of the semi-conductor coating, etc.

When "solid" tantalum capacitors having manganese dioxide cathodes produced via pyrolysis of manganese nitrate-solutions contained within the porous anode bodies were introduced in the 1950's, attempts were made to coat anodized aluminum capacitor foil coupons with manganese dioxide via the same pyrolysis method used to fabricate solid tantalum capacitors. The high moisture, temperature, and acidity associated with the pyrolysis process proved to be excessively aggressive and the electrical performance of the resulting devices was found to be inadequate to meet the demands of the electronics marketplace.

With the development of reasonably stable organic semi-conductors and intrinsically conductive polymers in the 1970's and 1980's, practical "solid" aluminum capacitors became possible and a line of solid aluminum capacitors having a cathode material consisting of an amine/TCNQ charge-transfer salt, organic semi-conductor was introduced in the early 1980's by the Sanyo Corporation (the "OS-Con" capacitor line). More recently, intrinsically conductive polymers such as polyaniline, polypyrrole, polythiophene, and their derivatives, doped with strong organic acids, have been utilized as cathode materials in both tantalum and aluminum electrolytic capacitors.

Organic charge-transfer salts and intrinsically conductive polymers, while more expensive than the manganese dioxide cathode material present in conventional solid tantalum capacitors, offer several advantages as solid cathode materials. They do not support combustion as does manganese dioxide, they have a range of conductivity such that they may be made significantly more conductive than manganese dioxide, and as stated above, they may be applied under conditions which are not so destructive to aluminum anode materials.

The high conductivity organic polymer cathode material and the short conductive path length inherent with etched, and anodized aluminum anode foil have been combined to yield solid capacitors having very low equivalent series resistance. Devices of this type have been constructed having ESR values below 0.005 ohm and having a volume of only a small fraction of a cubic centimeter.

The preferred surface mount configuration of solid aluminum capacitors having conductive polymer cathodes usually consist of a stack of etched and anodized aluminum foil coupons partially coated with conductive polymer, graphite, and conductive paint layers and with the cathode coatings bonded together and attached to a lead frame with conductive adhesive to form a negative terminal. The uncoated ends of the etched and anodized coupons are welded to each other and to a portion of a lead frame to form a positive terminal after encapsulation and singulation of the device. The devices are usually encapsulated by molding using a non-conductive polymer, usually an epoxy compound. The individual devices are singulated by post-molding removal of the non-electric terminal portion of the lead frame used to support the anode coupons during device construction.

The aluminum anode coupons used to fabricate surface mount aluminum capacitors are usually cut from the large master rolls of etched and anodized foils used by the aluminum capacitor industry. The coupons may be punched from a roll of foil or, after slitting to a proper width, by cutting the foil to appropriate lengths. Before the coupons are fabricated into capacitors, the cut or slit edges have to be anodized in order to coat these edges with insulating oxide (the anode coupons would be short-circuited at the edges without this anodizing step). Multiple cut aluminum anode coupons are fastened to electrically conductive strips or bars via welding, and a number of these strips or bars are fastened a frame or process head for bulk edge anodizing. The frame or process head of coupons is then suspended above a tank of electrolyte with the coupons immersed in the electrolyte, and current is passed through the coupons (coupons biased positive) to produce the insulating anodic oxide film on the edges of the coupons. This edge anodization is usually carried out in an electrolyte of similar composition to those used to anodize low voltage aluminum capacitor foil. (Currently, all of the solid surface mount capacitors containing aluminum anodes and a conductive polymer are rated as 25 volt or less devices). Most low voltage aluminum capacitor foil is anodized in aqueous solutions of organic acid salts. The ammonium salts of adipic acid and citric acid are the salts most commonly used for this purpose.

One factor complicating the edge anodizing of cut surface mount aluminum anode foil coupons is the porosity of the material. The etch tunnel structure of low voltage anode foil is extremely porous for the purpose of maximizing foil surface area and hence, capacitance per microscopic foil surface area and volume. When cut anode foil coupons are suspended in anodizing electrolyte, the electrolyte has a tendency to wick up the foil and create and electrical short-circuit to the carrier strip or bar from which the anodes are suspended during the edge anodizing step. In order to limit wicking of the edge anodizing electrolyte, a narrow stripe of masking material is usually applied to the anode coupons prior to the edge anodizing step. This masking material may be an epoxy, a silicone resin, an epoxy-silicone, a polyimide, a fluoropolymer, etc., so long as the material forms an effective mask upon cross linking, solvent evaporation, or melting without producing corrosive anionic by-products which would attack the foil during the anodization step.

Once the edges of the aluminum anode foil coupons have been anodized, the coupons are coated with an intrinsically conductive polymer by methods known to those skilled in the art and then rinsed to remove impurities/by-products of the polymer impregnation process. The anode bodies are then generally subjected to one or more "reformation" steps to isolate any flaw sites or damage done during the impregnation step. The reformed and rinsed coupons are then coated with graphite and a conductive paint and are assembled into finished devices as described above.

While having the advantages of relatively low cost and very low equivalent series resistance (ESR), solid aluminum surface mount capacitors are not without certain disadvantages. These devices tend to be moisture sensitive due to the well-known tendency of anodic aluminum oxide to undergo a hydration reaction in the presence of moisture yielding a hydrated anodic oxide having increased electrical leakage properties after storage or in use in humid environments. The anodized foil used to produce these devices is a somewhat brittle and inevitable flexing and bending of the foil during fabrication of the anode coupons (i.e., the damage done during foil straightening, cutting, welding, and masking on mass production equipment) results in damage to the anodic oxide film which is difficult to completely repair during the edge anodizing step. Electrolytic decomposition products of the organic acid containing electrolytes used to anodize the cut foil edges may also cause local corrosion of the coupons, especially at the electrolyte air-line (formic and oxalic acids are frequently found to be among the electrolytic decomposition products of the organic acid salts used to anodize aluminum foil; both of these acids are corrosive toward aluminum). The corrosion at the air-line is much worse in the presence of even trace quantities of chloride or other anionic species that are corrosive towards aluminum.

It has been known for many years that orthophosphate anion strongly adsorbs on the surface of aluminum oxide. It has also been known that aqueous solutions of orthophosphate salts may be used, under certain circumstances as anodizing electrolytes to anodize aluminum capacitor foil. It has been found that the pH of orthophosphate-based aqueous anodizing electrolytes for aluminum must be between about 5.0 and 7.0 for best results (i.e., to produce anodized foil having the lowest leakage current and highest capacitance value in finished capacitors).

As with most aluminum foil anodizing, aqueous phosphate anodizing electrolytes are generally used at temperatures above 85° C. (in mass foil production, where anodizing currents frequently exceed 1,000 amperes, joule heating of the electrolyte by the anodizing current is sufficient to raise the electrolyte temperature to this level). The rapid evaporation of the water fraction of the electrolyte at the point of contact between the anode foil and the electrolyte surface leads to concentration of the anionic species at the air-line contact region of the foil with the electrolyte. The acidic nature of the orthophosphate anion leads to so-called air-line corrosion of the aluminum anode foil during anodizing unless a low concentration of orthophosphate salt is used, generally below a concentration of 0.1%, and the foil has a hydrated surface (i.e., a surface coating consisting mainly of pseudoboehmite, produced by a short exposure to water at a temperature close to the boiling point), as the hydrated surface coating has been found to be more resistant to attack by acidic orthophosphate than is uncoated aluminum. When these conditions of pH, phosphate concentration, and foil pre-hydration are met, the anodic oxide produced has been found to be particularly stable with respect to hydration attack in service in electrolytic capacitors containing a liquid electrolyte having a water component.

Aluminum anode foil anodized in phosphate solutions is commonly used to produce capacitors for alternating current applications (such as motor-start capacitors) where hydration degradation of the anodic oxide is particularly severe. The presence of orthophosphate anion, incorporated from anodizing electrolytes containing this species, appears to inhibit the reaction of the anodic oxide to a marked degree.

Unfortunately, aluminum anode foil for use in low voltage surface mount capacitors, which is very subject to hydration attack in service, does not readily lend itself to anodizing in aqueous phosphate electrolyte solutions, and so is difficult to render resistant to hydration attack in service. The relatively low anodizing voltage makes the pre-hydration step, described above, impractically difficult to control due to the very thin layer required for low voltage anodizing. Very thin pre-hydration layers on aluminum are also less resistant to the acidic orthophosphate attack, described above, than are the thicker hydrated surface layers usually employed. Even when the coupons used to construct low voltage surface mount aluminum capacitors are fabricated from pre-anodized foil and are only anodized on the cut edges, the use of aqueous phosphate containing electrolyte solutions results in so-called air-line corrosion of the edges of the foil.

What is needed is an electrolyte/method of anodizing for low voltage anode foil coupons for use in surface mount aluminum capacitors which produces a hydration-resistant anodic oxide and which may be used to anodize the cut edges of pre-anodized foil coupons or un-anodized coupons, said coupons being suspended from process bars and partially immersed in the anodizing electrolyte as described above.

U.S. Pat. No. 3,796,644 describes an anodizing method involving the use of high boiling point organic solvents (in excess of 150° C., preferably in excess of 185° C.) and containing between 0.1% and 10% water. The anodizing temperature is as high as possible for the purpose of producing crystalline, hydration-resistant barrier oxide. While this method may be used to anodize capacitor foil coupons for surface mount capacitors, it has many disadvantages. The best results with the preferred solvent, ethylene glycol, are obtained at 185° C.. This high temperature (within 20° C. of the boiling point of the solvent) leads to very rapid evaporation of the solvent. While the anionic electrolyte components claimed include phosphate; phosphate salts have been found to be only sparingly soluble in the solvents of the patent, including the preferred solvent, ethylene glycol. The preferred embodiment is an ethylene glycol solution containing 1% water, 30% ammonium pentaborate, and only 0.1% ammonium di-hydrogen phosphate due to the limited orthophosphate solubility in this electrolyte. The activity of the orthophosphate ion appears to be limited by the relatively large concentration of pentaborate anion present, requiring the high temperature (i.e., 185° C.) for more complete hydration resistance of the foil anodized in this electrolyte.

U.S. Pat. No. 4,146,439 describes further advantages obtained with the ethylene glycol-ammonium pentaborate electrolytes containing a small amount of ammonium di-hydrogen phosphate (in this case, about 0.2 wt. %). It was found that these electrolytes are more efficient than straight aqueous anodizing electrolytes or glycol-borate solutions that do not contain phosphate. A charge savings of 30–35% over aqueous electrolytes is claimed. It is pointed out that these electrolytes may be used at lower temperatures than have traditionally been used to anodize aluminum, for example anodizing temperature of about 25° C.

The hydration resistance of anode foil anodized in the electrolytes and at a temperature of 25° C. does not have the high hydration resistance of the foil formed in similar electrolytes but at the temperatures of 150–185° C.

SUMMARY OF THE INVENTION

The invention is directed to a method of anodizing comprising suspending at least one aluminum substrate into an electrolyte solution and applying an anodizing current to the electrolyte solution, wherein the electrolyte solution comprises from about 5 to about 99.5 wt % glycerine, about 0.05 to about 5.0 wt. % of at least one soluble orthophosphate salt selected from the group consisting of ammonium phosphates, alkali metal phosphates, amine phosphates, or mixtures thereof, and water.

The aluminum substrate may be a pre-anodized substrate having cut edges or an un-anodized substrate. In one embodiment of the invention, the anodizing temperature is from about 25° C. to 85° C. In another embodiment of the invention, the anodizing temperature is from about 85° C. to about 125° C. and the electrolyte solution has less than 10 wt % water.

It is to be understood that both the foregoing general description and the following detailed description are exemplary and explanatory only and are not restrictive of the present invention as claimed.

DETAILED DESCRIPTION OF THE PREFERRED EMBODIMENTS

It was discovered that electrolytes containing glycerine, one or more orthophosphate salts, and a variable amount of water, may be used to anodize aluminum anode foil substrates, such as coupons for use in solid surface mount capacitors, to produce hydration resistant anodic oxide, either on the cut edges of pre-anodized substrates or on un-anodized substrates. Such electrolytes may be formulated for use over a wide temperature range.

The electrolyte solutions of the invention impart hydration resistance with little or no corrosion at the air-line (air-electrolyte interface of the coupon). This is in contrast to prior art electrolyte solutions which readily evaporate, allowing salts to deposit at the air-electrolyte interface of the coupon to a degree which facilitates corrosion.

The high hydration resistance of anodic aluminum oxide formed with electrolytes of the invention is believed to be due to the activity of the orthophosphate ion which is readily incorporated into anodic alumina films formed in the electrolytes due to the absence of competing anionic species. Because glycerine is hygroscopic, has a high boiling point (minimizing evaporation), and tends to be buffering towards phosphate, maximum phosphate incorporation occurs without air-line corrosion.

In the electrolyte solution of the invention, the glycerine and water are the solvent, and electrolyte-soluble orthophosphate salt is the solute.

Glycerine (a.k.a., for example, glycerol, 1,2,3-propane triol) comprises from about 5 wt % to about 99.5 wt % of the solvent and the remainder of the solvent is water. The electrolyte solution contains from about 5 wt % to about 99.5 wt % glycerine. Glycerine has a high boiling point (about 289° C.) and does not evaporate as rapidly as other solvents which have been used to anodize aluminum such as ethylene glycol. Glycerine is extremely hygroscopic when concentrated. A 90% glycerine/10% water solution boils at 140° C. (at sea level). A 90% ethylene glycol solution boils at 130° C. A 90% solution of propylene glycol or diethylene glycol boils at 120° C. Solutions of 90% polyethylene glycols boil at only 107° C. to 110° C. Glycerine is also much more resistant to anodic oxidation to species corrosive to aluminum than is ethylene glycol.

The electrolyte-soluble orthophosphate salt may be an ammonium phosphate, an alkali metal phosphate, an amine phosphate, or mixtures thereof Suitable alkali metal salts include, but are not limited to, mono-sodium phosphate, di-potassium phosphate, and sodium potassium phosphate. Suitable ammonium salts include, but are not limited to, mono-ammonium phosphate or di-ammonium phosphate. Suitable amine phosphates may be prepared in advance or in situ by neutralizing to a pH of 4 to 9 an aqueous glycerine solution of orthophosphoric acid with mono-ethanolamine, tri-ethanolamine, di-ethyl ethanolamine, etc.

The type and amount of the orthophosphate salt should impart a pH between about 4 and about 9 to the finished electrolyte. The electrolyte solution contains about 0.05 to about 5 wt. % of the at least one orthophosphate salt, preferably about 0.1 to about 2 wt %. The phosphate content is maintained below the concentration at which the onset of air-line corrosion is observed with plain (un-etched) aluminum foil anodized to the voltage for which the electrolyte composition is to be used. In general, the orthophosphate salt and glycerine are present in proportion amounts such that the higher the concentration of phosphate salt, the higher the concentration of glycerine.

The electrolyte of the invention is particularly useful when anodizing capacitor coupons suspended in the electrolyte solution such that the point of contact between the electrolyte-air interface remains fixed at the same point on the coupons during the anodizing process. This is known as static anodizing in contrast to anodizing normally done in the industry, in which the foil progressively moves through the electrolyte solution in a reel-to-reel process. Static anodizing is used for etched and anodized or un-anodized aluminum coupons, generally with a relatively low anodizing temperature such as 25° C. to 85° C. The electrolyte of the invention is also particularly useful when hydration resistance is desired but the maximum hydration resistance is not required.

It is believed that, at the electrolyte solution/air interface against the anode foil, or "air-line", the aqueous and (in the case of ethylene glycol) organic solvent components of the electrolyte evaporate. This evaporation tends to concentrate the anionic species locally and eventually leads to air-line corrosion with conventional electrolytes when the orthophosphate anion concentration grows sufficiently high. Although not wishing to be bound by any particular theory, it is thought that, with glycerine solutions, the evaporation of the organic solvent component is greatly reduced due to the high boiling point of glycerine. The evaporation of water at the air-line is suppressed due to the high hygroscopicity of glycerine and the electrochemical oxidation of the organic portion of the solvent to corrosive species is avoided by employing glycerine in place of ethylene glycol.

The corrosive effects of the oxidation products of ethylene glycol are documented in: "Side Reactions During the Anodization of Aluminum in a Glycol Borate Electrolyte", by Robert W. Santway and Robert S. Alwitt, *Journal of the Electrochemical Society*, Vol. 117, No. 10, pp. 1282–1286 and in "The Potential for Positive Tab Corrosion in High Voltage Aluminum Electrolytic Capacitors Caused By Electrolyte Decomposition Products", by Brian Melody; presented at the 1993 Capacitor and Resistor Technology Symposium, pp. 199–205, *Symnosium Proceedings*.

For aluminum anode foil substrates requiring maximum hydration resistance, the orthophosphate salt content of the electrolyte should be increased. In order to provide higher phosphate concentrations without increasing the amount of air-line corrosion, the water content should be reduced to less than about 10% by weight, preferably less than about 1%, of the solvent portion of the electrolyte. The increased glycerine content of the electrolyte minimizes evaporation and phosphate concentration at the air-line during anodizing. In the extreme case, glycerine containing only 0.5% to 1.0% water is used. This glycerine is considered to be pure glycerine and contains water from the short exposure to the atmosphere at the operating temperature range. Due to the relatively high viscosity of such low water glycerine at room temperature, the operating temperature range for the electrolytes of the invention is approximately 85° C. to 135° C.

There are few ammonium and alkali metal orthophosphate salts that are significantly soluble in glycerine containing less than 10% water. One salt having high solubility in pure glycerine is dibasic potassium phosphate and solutions containing 12 wt % or more are readily prepared at elevated temperature, for example, at 85° C. to 125° C. Solutions of up to about 5 wt. % of dibasic potassium phosphate may be used to anodize aluminum anode foil coupons for surface mount capacitor use at 100° C. with minimal air-line corrosion, though lower current densities must be employed than when higher water content electrolytes are employed.

To reduce the tendency of orthophosphate salt solutions in glycerine/water to cause air-line corrosion of aluminum anode substrates at higher salt concentrations, the subclass of amines known as alkanolamines was explored. Alkanolamines have relatively low vapor pressure and toxicity. Electrolytes containing such salts have been used as the "working" or "fill" electrolytes contained in aluminum electrolytic capacitors utilizing liquid electrolyte systems. However, alkanolamine phosphate salts have low solubility in polar organic solvents. As the glycerine content of the electrolyte of the invention is increased (and the water content reduced) the solubility of most alkanolamine phosphates decreases rapidly, limiting their utility for the purposes of the invention.

However, it was discovered that alkanolamines containing a dimethyl amino group and one or more ethylene oxide equivalents form a series of salts with phosphoric acid that tend to be waxy solids when dry at room temperature and which tend to have low softening points and very high solubility in polar, organic solvents. Such alkanolamines include dimethyl ethanolamine (dimethyl amino ethanol), and dimethyl ethoxy ethanolamine (dimethyl amino ethoxy ethanol).

These salts, which may be readily prepared in situ, yield excellent results as ionogens in the electrolytes of the invention. These salts are highly ionized due to the strong alkalinity of the dimethyl amino group. Moreover, the conductivity of the glycerine solutions of these alkanolamine phosphate salts is sufficiently high so that no other anionic species (i.e., no carboxylic acid, etc.) is required to impart additional conductivity to the anodizing electrolyte. Thus a high concentration of orthophosphate ion is available at the anode foil surface, without competition from non-phosphate anionic species (such as borate, carboxylate, etc.) thus imparting maximum hydration resistance but with minimal air-line corrosion of the aluminum coupons due to the waxy to liquid nature of the alkanolamine phosphate salts formed by evaporative concentration at the air-line.

EXAMPLES

The invention will be further described by reference to the following examples. These examples should not be construed in any way as limiting the invention.

Example 1

Two electrolytes were prepared, each containing 10 wt. % glycerine and designed to be used at relatively low temperature (25° C. to 80° C.) and at relatively high current density, such as 10 or more mA/cm$^2$ of anode foil surface.

| Electrolyte A | |
|---|---|
| 10 wt. % | glycerine |
| 1.0 wt. % | di-ammonium phosphate |

| Electrolyte B | |
|---|---|
| 10 wt. % | glycerine |
| 0.1 wt. % | di-ammonium phosphate |

Both Electrolyte A and Electrolyte B were used to anodize plain (un-etched) aluminum foil coupons at 1.0 mA/cm$^2$ and at 10 mA/cm$^2$ at 50° C. to 60° C.

The coupons anodized in Electrolyte A both had a stripe of air-line corrosion present on the foil at the air/electrolyte solution interface.

The coupons anodized in Electrolyte B were both free of air-line corrosion. With this phosphate salt, a salt concentration of 0.1 wt. % gives the desired results, while a concentration of 1.0 wt. % of the phosphate salt proves to be excessive if air-line corrosion is to be avoided. Further, the air-line corrosion effect is largely independent of current density.

Example 2

The following test was performed to illustrate the efficacy of the electrolytes of the invention with respect to the production of highly insulating (low electrical leakage) anodic oxide on aluminum anode foil coupons for use in surface mount capacitors.

A number of coupons were cut from aluminum anode foil approximately 100 microns thick and having approximately 0.15 square centimeters of active macroscopic surface area. The foil used for these coupons had been electrochemically etched to greatly increase the surface area (over 100 fold) and then anodized in a traditional aqueous anodizing solution containing dibasic ammonium adipate as the ionogen. This foil was rated with a 13 volt withstanding voltage and each coupon had a capacitance of approximately 12 microfarads. A "stacked foil" surface mount aluminum capacitor might contain 4 of these coupons and have a nominal capacitance rating of 47 microfarads. The coupons were suspended from stainless steel process bars via resistance welding.

The aluminum anode foil anodized in traditional borate or organic acid anodizing electrolyte solutions is extremely susceptible to hydration damage upon exposure to the atmosphere. The foil reacts with moisture, causing the anodic oxide dielectric to become much less electrically insulating and to exhibit higher leakage currents. It was advantageous to heat the anode coupons to a temperature between 200° C. and 400° C. for a time sufficient to dehydrate the anodic oxide. In the present case, the coupons were heated to a temperature of 300° C. for 30 minutes.

The batch of racked, heat-treated coupons was then split in half. Half of the coupons were anodized (to provide an oxide coating on the cut edges and heal any handling fractures present) in a typical aqueous ammonium adipate electrolyte solution and half of the coupons were anodized in an electrolyte of the invention (10 wt. % glycerine/0.1 wt. % dibasic ammonium phosphate). The coupons were then rinsed in de-ionized water and heat-treated at 300° C. for 30 minutes to "depolarize" the foil (i.e., to drive-off water of hydration). The coupons were then subjected to a second anodizing step in the same electrolytes described above. The results are presented in Table 1.

TABLE 1

| 1st Edge Anodizing Step | current after 10 minutes |
|---|---|
| Aqueous Ammonium Adipate | 5.67 μA/coupon |
| Glycerine/Ammonium Phosphate | 0.62 μA/coupon |
| 2nd Edge Anodizing Step | current after 7 minutes |
| Aqueous Ammonium Adipate | 2.35 μA/coupon |
| Glycerine/Ammonium Phosphate | 0.34 μA/coupon |

Table 1 shows the superior leakage current performance of the oxides formed using the electrolytes of the invention. The leakage current observed is about 5 to 10 times higher with the conventional aqueous ammonium adipate electrolyte solution than with the electrolytes of the invention.

Example 3

To illustrate the resistance to hydration attack of aluminum capacitor anode foil for surface mount capacitors which have been exposed to anodizing steps in the electrolyte of the invention, coupons of anodized (to 13 volts) aluminum anode foil were cut and welded to carrier bars as in Example 2. The coupons were anodized in a traditional aqueous ammonium adipate electrolyte solution and heat-treated at 300° C. for 30 minutes to reduce hydration of the anodic oxide. After heat-treatment, the coupons were anodized to 13 volts at 50° C. to 60° C. (10 minutes at voltage), rinsed in de-ionized water, heat-treated at 300° C. for 30 minutes and anodized to 13 volts at 50° C. to 60° C. for 7 minutes.

Half of the coupons were anodized (after the initial heat-treatment) in an electrolyte of the invention (10 wt. % aqueous glycerine/0.1 wt. % dibasic ammonium phosphate) and half in a traditional electrolyte of aqueous ammonium adipate solution.

Following rinsing after the final anodizing step, the coupons from both groups were immersed in de-ionized water at 70° C. for 1 hour. The coupons were then removed from the de-ionized water and placed in the respective anodizing electrolytes used to anodize the cut edges and voltage was applied. The leakage current results are given in Table 2.

TABLE 2

| | current after 15 seconds | current after 7 minutes |
|---|---|---|
| Edges Anodized in Aqueous Ammonium Adipate Solution* | 1565.8 μA/coupon | 36.513 μA/coupon |
| Edges Anodized in Glycerine/Dibasic Ammonium Phosphate** | 1.112 μA/coupon | 0.368 μA/coupon |

*Control (no 70° C. de-ionized water immersion) current was 1.816 μA/coupon..
**Control (no 70° C. de-ionized water immersion) current was 0.303 μA/coupon.

The electrolyte of the invention not only produces a more insulating anodic oxide (0.303 μA/coupon versus 1.816

μA/coupon), but also produces anodic oxide which is much more resistant to hydration degradation (0.368 μA/coupon versus 36.513 μA/coupon following immersion in 70° C. de-ionized water for 60 minutes). The single most important aspect of this test is that the initial (post 70° C. de-ionized water exposure) current for the conventionally anodized coupons was in excess of 1,000 times as high as the initial (post 70° C. de-ionized water exposure) current observed for the coupons anodized with the electrolyte of the invention.

Example 4

In order to demonstrate the efficacy of the electrolytes and method of the invention with respect to the manufacture of aluminum foil anode bodies suitable for assembly and molding to yield finished surface mount aluminum capacitors, the following test was conducted:

Anode foil coupons were cut from commercially available etched and anodized (13 volts) aluminum capacitor anode foil (anodized in traditional aqueous ammonium adipate electrolyte solution) as in Example 2 and Example 3. The coupons were heat-treated at 300° C. and 30 minutes (to reduce foil hydration which occurred in transit, etc.) The coupons were then split into two groups for edge anodization.

One group was anodized in an electrolyte of the present invention (10 wt. % aqueous glycerine and 0.1 wt. % dibasic ammonium phosphate). The second group was anodized in a traditional electrolyte solution (aqueous dibasic ammonium adipate solution).

Both groups were anodized for 10 minutes at 50° C. to 60° C., 13 volts, and then rinsed in de-ionized water. Both groups were then heat-treated at 300° C. for 30 minutes. Both groups were then anodized for 7 minutes at 50° C. to 60° C., 13 volts and then rinsed in de-ionized water again.

Both groups of anodes foil coupons were then processed identically through process steps to impregnate the pore structure of the foil with a conductive polymer. The coupons were then coated with graphite and a silver-loaded conductive paint to produce capacitor bodies ready for assembly into finished capacitors.

The electrical parameters of the silver paint-coated capacitor bodies were then determined. The results are given in Table 3.

TABLE 3

| Parameter | Edges Anodized in a Traditional Electrolyte | Edges Anodized in an Electrolyte of the present invention |
| --- | --- | --- |
| Capacitance | 13.96 microfarads | 12.79 microfarads |
| ESR | 0.037 ohms | 0.034 ohms |
| D. C. Leakage of good parts (DCL @ 6 volts) | 0.193 μA | 0.087 μA |
| Number of high DCL parts (above 3.2 μA) | 6/48 | 0/48 |

It is seen from Table 3 that the electrolyte and method of the invention results in anode bodies having less than half of the mean leakage current of and a greatly reduced incidence of high leakage current failures compared to traditional electrolytes even when the electrolyte is only used to anodize the cut edges of the foil coupons instead of for the total anodic oxide production. The higher capacitance obtained when anodizing with the traditional (non-phosphate-containing, aqueous organic acid salt) electrolyte appears to be due to the presence of incompletely formed and somewhat hydrated anodic oxide. The lower capacitance obtained with the electrolyte and method of the present invention appears to be due to the minimization of the hydrated condition of the anodic oxide present and the thickening of any thin spots in the anodic oxide (due to hydration or incomplete anodization), resulting in a much more uniform oxide which has the additional benefit of high resistance to hydration degradation.

Example 5

This example demonstrates that the method of the invention forms anodic oxide films on aluminum foil coupons for use in surface mount solid aluminum capacitors under conditions which produce anodic oxide having extreme hydration resistance (i.e., coupons suspended from a bar, as in surface mount capacitor manufacture, and anodized in an electrolyte of the invention having a low water content, phosphate as the only anion, and at an elevated temperature.)

An unetched aluminum coupon was suspended from a process bar. The lower portion of the coupon (area= approximately 100 square centimeters) was immersed in the following electrolyte solution:

2 wt. % dibasic potassium phosphate 97 wt. % glycerine 1 wt. % de-ionized water

The electrolyte solution was contained in a 1-liter stainless steel beaker and was maintained at a temperature of 100° C. to 106° C. A constant current of 0.5 milliamperes/$cm^2$ was applied to the aluminum coupon (coupon biased positive) until a voltage of 15 volts was reached (such voltage as might be used to anodize aluminum capacitor coupons for use in 6 volt surface mount capacitors). The coupon was then allowed to "age-down" as seen in Table 4.

TABLE 4

| Time | Voltage | Current |
| --- | --- | --- |
| Turn-on | 2.7 volts | 50 milliamperes |
| 1 minute | 13.98 volts | 50 milliamperes |
| 2 minute | 15.00 volts | 6.0 milliamperes |
| 3 minute | 15.00 volts | 3.5 milliamperes |
| 4 minute | 15.00 volts | 2.7 milliamperes |
| 5 minute | 15.00 volts | 2.4 milliamperes |
| 6 minute | 15.00 volts | 1.7 milliamperes |

After less than 5 minutes at voltage, the current had diminished by a factor of over 25-fold, indicating the rapid growth of highly insulating oxide. No air-line corrosion was present on the coupon following this anodization step.

Example 6

This example demonstrates the utility of dimethyl amino ethanol as a cationic material useful for the neutralization of phosphoric acid to yield near-neutral pH solutions in polar solvents and the applicability of the dimethyl amino ethanol phosphate solution in aqueous glycerine to the formation of anodic aluminum oxide films on aluminum coupons suspended in these solutions without corrosion at the airline.

A coupon of unetched aluminum was suspended from a process bar, with the lower portion of the coupon, approximately 25 $cm^2$, immersed in the following electrolyte solution:

1,500 grams, 10% glycerine 1.8 grams, phosphoric acid (85%)

3.0 grams, dimethyl amino ethanol

The solution temperature was maintained at 45° C. to 55° C.

A voltage of 15.6 to 15.7 volts was applied across the cell (coupon biased positive, electrolyte biased negative). The current decayed as follows:

| | |
|---|---|
| Initial | 98 milliamperes |
| 1 minute | 2.0 milliamperes |
| 2 minutes | 1.2 milliamperes |
| 3 minutes | 0.95 milliamperes |
| 4 minutes | 0.85 milliamperes |

Thus, within 3–4 minutes, the current decayed to less than 1% of the initial value, indicating rapid production of highly insulating anodic oxide film. No trace of airline corrosion was present on the coupon following the production of the anodic oxide.

Example 7

The following example demonstrates the ability of the electrolytes of the invention which contain dimethyl amino ethanol (dimethyl ethanolamine) as the cationic species to act as primary anodizing electrolytes (to give rise to anodic oxide films having extreme hydration resistance due to the presence of phosphate as the sole anionic species.)

A coupon of aluminum capacitor foil which was highly etched electro chemically (to increase the surface area by a factor of approximately 100-fold), but not anodized was suspended from a process bar and the lower portion of the coupon (approximately 100 cm$^2$) was immersed in the electrolyte solution of Example 6. The coupon was then anodized to approximately 15.6 volts at a current of 1 ampere (10 milliamperes/cm$^2$). The electrolyte temperature was maintained at a temperature of 58–60° C. The electrical results are presented in Table 5.

TABLE 5

| Time | Voltage | Current |
|---|---|---|
| Turn-on | 12 volts | 1,000 milliamperes |
| 1 minute | 14.7 volts | 994 milliamperes |
| 2 minutes | 15.6 volts | 901 milliamperes |
| 3 minutes | 15.6 volts | 759 milliamperes |
| 4 minutes | 15.6 volts | 639 milliamperes |
| 5 minutes | 15.6 volts | 540 milliamperes |
| 10 minutes | 15.6 volts | 229 milliamperes |
| 15 minutes | 15.6 volts | 107 milliamperes |
| 20 minutes | 15.6 volts | 55 milliamperes |
| 25 minutes | 15.6 volts | 32 milliamperes |
| 30 minutes | 15.6 volts | 18 milliamperes |

Thus, after only 30 minutes, the current passing through this highly etched foil had decayed to a value below 2% of the initial anodizing current, indicating the rapid production of highly insulating aluminum oxide. No corrosion was found at the electrolyte airline on the coupon.

Example 8

In order to demonstrate the ease with which the method and electrolytes of the invention may be used to anodize not only the cut edges of etched and anodized capacitor coupons cut from anodized sheets of capacitor foil, but also to anodize etched and un-anodized coupons (i.e., the method and electrolytes of the invention may be used to produce the total amount of anodic oxide on the coupons) for use in surface mount solid aluminum capacitors, the following anodizing test was performed using etched but un-anodized capacitor foil.

A coupon was cut from etched but un-anodized capacitor anode foil and approximately 50 cm$^2$ of the end of the coupon was immersed in the following electrolyte solution contained in a stainless steel beaker:

1,625 grams of synthetic glycerine (99.7%)
36 grams of phosphoric acid (85%)
63 grams of dimethyl ethoxy ethanolamine
(water content=0.5–1.0%)

The electrolyte solution was maintained at a temperature of 100° C. to 106° C. and contained approximately 2% orthophosphate anion.

Voltage was applied to the coupon (positive bias) at a constant current of 20 milliamperes until a voltage of 15 volts was reached, at which time the current was allowed to decay with time. The voltage and current versus time are presented in Table 6.

TABLE 6

| Time | Voltage | Current |
|---|---|---|
| Turn-on | 1.38 volts | 20 milliamperes |
| 1 minute | 1.40 volts | 20 milliamperes |
| 10 minutes | 1.95 volts | 20 milliamperes |
| 30 minutes | 2.8 volts | 20 milliamperes |
| 1 hour | 4.0 volts | 20 milliamperes |
| 2 hours | 6.4 volts | 20 milliamperes |
| 3 hours | 8.9 volts | 20 milliamperes |
| 4 hours | 11.6 volts | 20 milliamperes |
| 5 hours | 14.4 volts | 20 milliamperes |
| 5.2 hours | 15.0 volts | 20 milliamperes |
| 6 hours | 15.0 volts | 6.8 milliamperes |
| 8 hours | 15.0 volts | 3.0 milliamperes |
| 10 hours | 15.0 volts | 2.0 milliamperes |
| 15 hours | 15.0 volts | 1.2 milliamperes |

The coupon was anodized at low current density (approximately 0.4 milliamperes/cm$^2$ instead of the more common 1 to 10+milliamperes/cm$^2$) in order to maximize the opportunity for airline corrosion from corrosive species (chloride, etc.) present at trace levels, and to demonstrate that, even in very low water content glycerine solutions containing a high level of phosphate (nearly 2 wt. % orthophosphate ion), no airline corrosion was observed, even after 15 hours of voltage application at 100° C.

This test also demonstrates the high solubility of the orthophosphate salts of the dimethyl amino ethanols (in this instance, dimethyl ethoxy ethanolamine). These materials have the general formula of $(CH_3)_2N(CH_2CH_2O)_xH$ (in this example, x=2).

The current aged-down smoothly to a very low (approximately 1 milliampere) value over a 15 hour anodization with no airline corrosion and, as indicated by the low current, a generally very high quality anodic oxide of high hydration resistance.

What is claimed:

1. A method of anodizing comprising suspending at least one aluminum substrate into an electrolyte solution and applying an anodizing current to the electrolyte solution, wherein the electrolyte solution comprises from about 5 to about 99.5 wt % glycerine, about 0.05 to about 5.0 wt. % of at least one soluble orthophosphate salt selected from the group consisting of ammonium phosphates, amine phosphates, or mixtures thereof, and water.

2. The method of claim 1 wherein the aluminum substrate is a pre-anodized substrate having cut edges or an un-anodized substrate.

3. The method of claim 1 further comprising anodizing at a temperature of from about 25° C. to about 85° C.

4. The method of claim 1 further comprising anodizing at a temperature of from about 85° C. to about 125° C.; wherein the electrolyte solution comprises less than 10 wt % water.

5. The method of claim 4 wherein the electrolyte solution comprises about 0.5 to about 1.0 wt % water.

6. The method of claim 1 wherein the pH of the electrolyte solution is between about 4 and about 9.

7. The method of claim 1 wherein the orthophosphate salt is an ammonium phosphate.

8. The method of claim 7 wherein the ammonium phosphate is mono-ammonium phosphate or di-ammonium phosphate.

9. The method of claim 1 wherein the orthophosphate salt is an amine phosphate.

10. The method of claim 9 wherein the amine phosphate is an alkanolamine.

11. The method of claim 10 wherein the alkanolamine is dimethyl ethanolamine, and dimethyl ethoxy ethanolamine.

12. The method of claim 9 wherein the electrolyte solution is prepared by neutralizing to a pH of about 4 to about 9 an aqueous glycerine solution of orthophosphoric acid with mono-ethanolamine, tri-ethanolamine, or di-ethyl ethanolamine.

13. A method of edge anodizing comprising suspending at least one anodized aluminum substrate having at least one cut edge into an electrolyte solution and applying an anodizing current to the electrolyte solution, wherein the electrolyte solution comprises from about 5 to about 99.5 wt % glycerine, about 0.05 to about 5.0 wt. % of at least one soluble orthophosphate salt selected from the group consisting of ammonium phosphates, amine phosphates, or mixtures thereof, and water.

14. The method of claim 13 further comprising anodizing at a temperature of from about 25° C. to about 85° C.

15. The method of claim 13 wherein the orthophosphate salt is di-ammonium phosphate.

16. A method of anodizing an un-anodized aluminum substrate comprising suspending at least one un-anodized aluminum substrate into an electrolyte solution and applying an anodizing current to the electrolyte solution, wherein the electrolyte solution comprises from about 90 to about 99.5 wt % glycerine, about 0.05 to about 5 wt. % of at least one soluble orthophosphate salt selected from the group consisting of ammonium phosphates, amine phosphates, or mixtures thereof, and less than about 10 wt % water.

17. The method of claim 16 further comprising anodizing at a temperature of from about 85° C. to about 125° C.

18. An electrolyte solution consisting of about 5% to about 99.5% by weight of glycerine, water, and about 0.05 to about 5.0 wt. % of at least one soluble orthophosphate salt selected from the group consisting of ammonium phosphates, amine phosphates, or mixtures thereof.

19. An electrolyte solution comprising of about 5 wt % to about 99.5 wt % of glycerine, water, and about 0.05 to about 5 wt. % of at least one dimethyl alkanolamine phosphate.

20. The electrolytic solution of claim 19 wherein the dimethyl alkanolamine is dimethyl ethanolamine or dimethyl ethoxy ethanolamine.

* * * * *

UNITED STATES PATENT AND TRADEMARK OFFICE
CERTIFICATE OF CORRECTION

PATENT NO. : 6,409,905 B1
DATED : June 25, 2002
INVENTOR(S) : Brian J. Melody et al.

It is certified that error appears in the above-identified patent and that said Letters Patent is hereby corrected as shown below:

<u>Column 14,</u>
Line 44, "$(CH_3)_2N(CH_2CH_{2O})_xH$" has been replaced with -- $(CH_3)_2N(CH_2CH_2O)_xH$ --.

Signed and Sealed this

Twenty-ninth Day of October, 2002

*Attest:*

*Attesting Officer*

JAMES E. ROGAN
*Director of the United States Patent and Trademark Office*